United States Patent
Hisada

[11] Patent Number: 4,487,485
[45] Date of Patent: Dec. 11, 1984

[54] RETROFOCUS WIDE-ANGLE PHOTOGRAPHIC LENS SYSTEM

[75] Inventor: Masaharu Hisada, Tokyo, Japan
[73] Assignee: Asahi Kogaku Kogyo Kabushiki Kaisha, Tokyo, Japan
[21] Appl. No.: 431,929
[22] Filed: Sep. 30, 1982
[30] Foreign Application Priority Data
  Oct. 30, 1981 [JP] Japan .................. 56-173751
[51] Int. Cl.$^3$ .............. G02B 9/64; G02B 13/04
[52] U.S. Cl. ................................. 350/459
[58] Field of Search ........................ 350/458, 459
[56] References Cited
  U.S. PATENT DOCUMENTS
  3,512,874  5/1970  Woltche .................. 350/459
  4,382,662  5/1983  Tokumaru et al. .......... 350/458

Primary Examiner—John K. Corbin
Assistant Examiner—Rebecca D. Gass
Attorney, Agent, or Firm—Sughrue, Mion, Zinn, Macpeak, and Seas

[57] ABSTRACT

A retrofocus wide-angle photographic lens system is composed, in order from the object size, of a first positive-meniscus lens having a convex surface directed toward the object, second and third negative-meniscus lenses having convex surfaces directed toward the object, fourth and fifth positive lenses, a sixth biconcave lens, a seventh positive lens, an eighth negative lens, and a ninth positive lens. The eighth and ninth lenses forming a doublet having a positive composite focal length.

4 Claims, 6 Drawing Figures

RETROFOCUS WIDE-ANGLE PHOTOGRAPHIC LENS SYSTEM

BACKGROUND OF THE INVENTION

The present invention relates to a retrofocus wide-angle photographic lens having an aperture ratio of 1:2.8, a view angle of about 76°, and a backfocus which is about 1.4 times the overall focal distance.

Retrofocus wide-angle lenses generally need to have a backfocus longer than the overall focal length. To provide such a longer backfocus, it is necessary that the negative refractive power of a front lens group be made greater, but it is then becomes difficult to correct spherical aberration and coma which are generated by the greater negative refractive power.

According to the present invention, the longer backfocus can be obtained by a lens having a focal length which is longer as compared with those of lenses for use in 35 mm cameras.

SUMMARY OF THE INVENTION

It is an object of the present invention to provide a wide-angle photographic lens having a focal length longer than that for use in 35 mm cameras, in which aberrations are well compensated for and a physical length is short for practical use.

BRIEF DESCRIPTION OF THE DRAWINGS

In the accompanying drawings.

DESCRIPTION OF THE PREFERRED EMBODIMENTS

Figure 1:
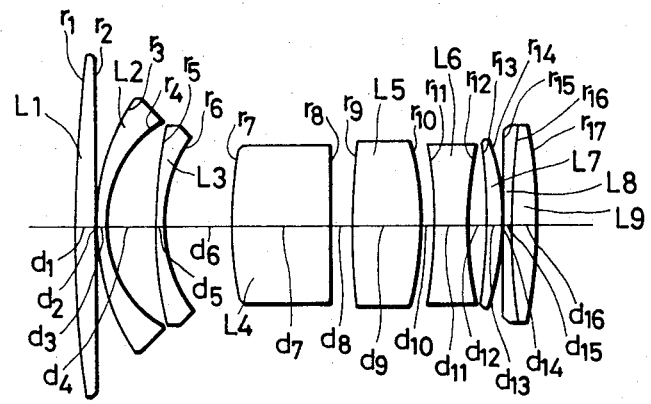
FIG. 1 is a diagram illustrative of a lens system according to Example 1.
Figure 2:
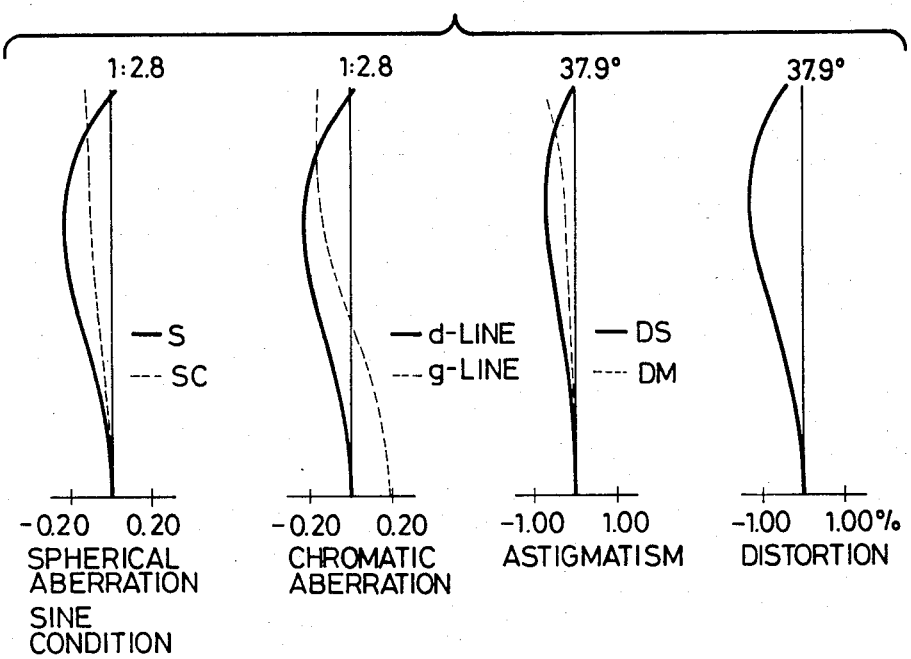
FIG. 2 is a set of diagrams showing various aberrations by the lens system of Example 1.
Figure 3:
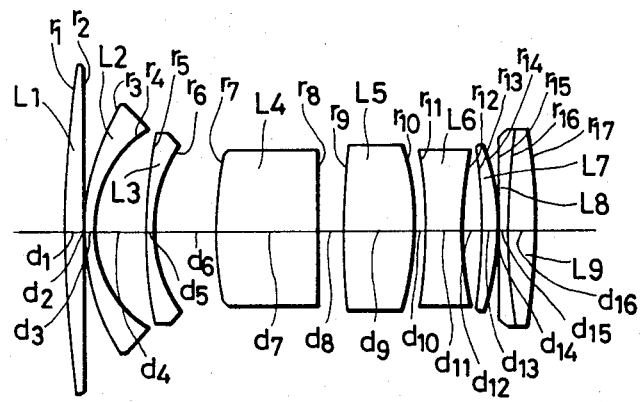
FIG. 3 is a diagram illustrative of a lens system according to Example 2.
Figure 4:
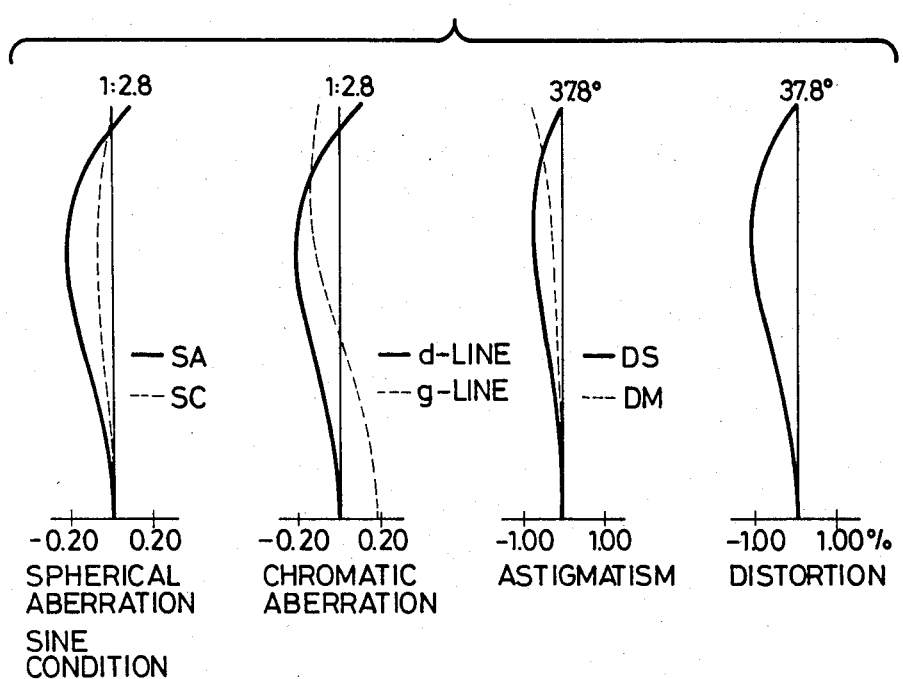
FIG. 4 is a set of diagrams showing various by the lens system of Example 2.
Figure 5:
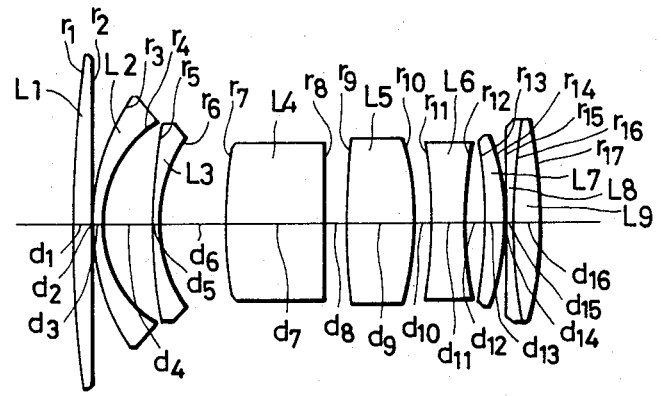
FIG. 5 is a diagram illustrative of a lens system according to Example 3.
Figure 6:
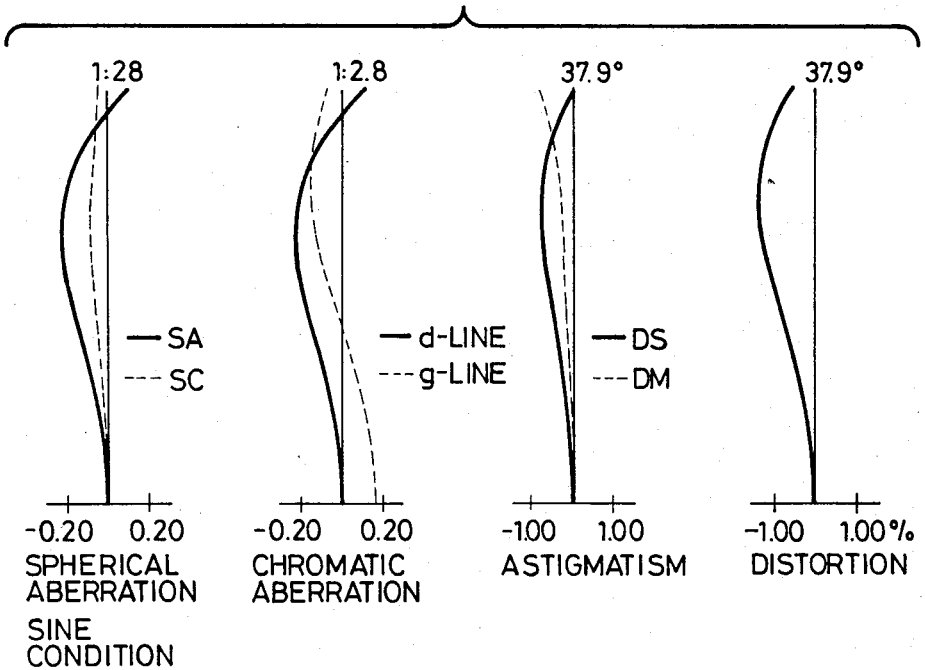
FIG. 6 is a set of diagrams showing various aberrations by the lens system of Example 3.

The present invention will now be described in detail with reference to the accompanying drawings.

A retrofocus wide-angle photographic lens according to the present invention comprises an eight-component nine-element lens system composed of a first positive-meniscus lens L1 having a convex side directed toward the object, second and third negative-meniscus lenses L2 and L3 having convex sides directed toward the object, fourth and fifth positive lenses L4 and L5, a sixth biconcave lens L6, a seventh positive lens L7, an eighth negative lens L8, and a ninth positive lens L9. The eighth and ninth lenses L8 and L9 form a doublet having a positive focal length. The first through ninth lenses are arranged in order from the object.

The lens system thus constructed satisfies the following requirements:

$$\frac{F}{1.3} < |F_{1\cdot2\cdot3}| < \frac{F}{0.8} \quad (F_{1\cdot2\cdot3} < 0) \tag{1}$$

$$1.0 < \frac{F_2}{F_3} < 1.4 \tag{2}$$

$$\frac{F}{0.6} < |F_{1\cdot2\cdot3\cdot4}| < \frac{F}{0.2} \quad (F_{1\cdot2\cdot3\cdot4} < 0) \tag{3}$$

$$\frac{F}{0.5} < |F_{1\cdot2\cdot3\cdot4\cdot5\cdot6}| < \frac{F}{0.3} \quad (F_{1\cdot2\cdot3\cdot4\cdot5\cdot6} < 0) \tag{4}$$

$$0.5F < d_7 + d_8 + d_9 < 0.7F \tag{5}$$

$$n_8 > 1.75 \text{ and } n_9 > 1.75 \tag{6}$$

The reference characters are defined as follows:

$F$: the overall focal length of the lens system;
$F_{1\cdot2\ldots i}$: the composite focal length up to the ith lens;
$F_i$: the focal length of the ith lens;
$d_j$ is the lens-to-lens distance or thickness of the jth lens;
$n_i$: the refractive index of the ith lens surface at the d-line;
$v_i$: Abbe number of the ith lens;
$\omega_i$: half angle of view:
$B_f$: backfocus The above requirements will be described below.

The requirement (1) serves to obtain a required backfocus. If $|F_{1\cdot2\cdot3}|$ were smaller than $F/1.3$, it would be easy to obtain a desired backfocus, but the Petzval's sum would be reduced and various aberrations would become worse. If $|F_{1\cdot2\cdot3}|$ were greater than $F/0.8$, various aberrations such as astigmatism and distortion could be corrected better, but it would be difficult to obtain a desired backfocus.

The requirement (2) serves to determine distribution of refractive power among the negative lenses in the front group, i.e., the first through third lenses L1, L2 and L3, in relation to the requirement (1). The effective aperture of the second lens L2 is greater than that of the third lens L3, and therefore the focal length of the second lens L2 should be made greater than that of the third lens L3 for better correction of the spherical aberration and coma. If $F_2/F_3$ were smaller than 1, then the refractive load imposed on the second lens L2 would be increased, and if $F_2/F_3$ were greater than 1.4, then the refractive load imposed on the third lens would be increased. In any case, it would become difficult to correct spherical aberration and coma.

The requirement (3) serves to determine the focal length of the fourth lens L4 in relation to the requirements (1) and (4) and obtain a desired backfocus. If $|F_{1\cdot2\cdot3\cdot4}|$ were greater than $F/0.2$, then a desired backfocus would be difficult to obtain. It would be desired to reduce $|F_{1\cdot2\cdot3}|$, which however would contribute to worse astigmatism and coma. If $|F_{1\cdot2\cdot3\cdot4}|$ were smaller than $F/0.6$, then a desired backfocus would be easy to obtain, but the refractive load imposed on the positive lenses following the fifth lens L5 would be increased, resulting in unbalanced aberrations.

The requirement (4) serves to correct coma and obtain a desired backfocus. If $|F_{1\cdot2\cdot3\cdot4\cdot5\cdot6}|$ were smaller than $F/0.5$, then a desired backfocus could more easily be obtained, but the load on the positive lenses following the seventh lens L7 would become larger, a condition which tends to increase coma and spherical aberration. If $|F_{1\cdot2\cdot3\cdot4\cdot5\cdot6}|$ were greater than $F/0.3$, then coma and spherical aberration could more easily be corrected, but difficulty would arise in obtaining a desired backfocus.

The requirement (5) is effective to achieve balanced aberrations, particularly coma. If $d_7+d_8+d_9$ were smaller than $0.5F$, then the ray of light emitted from the fifth lens L5 would go along a lowered path and act on coma to a smaller extent. As a result, the radius of curvature of the fifth lens L5 would have to be reduced in order to correct coma. This however would increase spherical aberration. If $d_7+d_8+d_9$ were greater than 0.7F, then aberrations could be corrected easily, but the physical length of the lens system would be increased.

The requirement (6) serves to correct spherical aberration. If $n_8$ and $n_9$ were smaller than 1.75, then the radii of curvature of the eighth and ninth lenses L8 and L9 would become smaller, and as a result spherical aberration would be increased. The absolute value of spherical aberration should be reduced because the lens system is designed for use with film sizes greater than 35 mm size. Therefore the requirement (6) must be always met. The requirement (4) is also effective to prevent an increase in spherical aberration, the prevention of such an increase being carried out effectively under the conditions of $F/0.5 < |F_{1\cdot 2\cdot 3\cdot 4\cdot 5\cdot 6}|$, $F_{1\cdot 2\cdot 3\cdot 4\cdot 5\cdot 6} < 0$.

Data on Examples of the present invention will now be described.

EXAMPLE 1

| $F = 100$, Aperture ratio 1:2.8, $\omega = 37.9°$ | | | | |
|---|---|---|---|---|
| $r_1$ | 391.289 | $d_1$ | 7.04 | $n_1/\nu_1$ 1.58913/61.0 |
| $r_2$ | 5866.233 | $d_2$ | 0.22 | |
| $r_3$ | 71.556 | $d_3$ | 3.33 | $n_2/\nu_2$ 1.48749/70.1 |
| $r_4$ | 38.809 | $d_4$ | 17.11 | |
| $r_5$ | 144.444 | $d_5$ | 2.89 | $n_3/\nu_3$ 1.48749/70.1 |
| $r_6$ | 47.511 | $d_6$ | 23.13 | |
| $r_7$ | 126.869 | $d_7$ | 34.47 | $n_4/\nu_4$ 1.72000/43.7 |
| $r_8$ | −30309.433 | $d_8$ | 7.78 | |
| $r_9$ | 270.000 | $d_9$ | 23.67 | $n_5/\nu_5$ 1.72000/43.7 |
| $r_{10}$ | −91.867 | $d_{10}$ | 4.33 | |
| $r_{11}$ | −174.198 | $d_{11}$ | 11.89 | $n_6/\nu_6$ 1.80518/25.4 |
| $r_{12}$ | 118.222 | $d_{12}$ | 6.18 | |
| $r_{13}$ | −169.133 | $d_{13}$ | 5.56 | $n_7/\nu_7$ 1.83481/42.7 |
| $r_{14}$ | −82.000 | $d_{14}$ | 0.22 | |
| $r_{15}$ | −2966.666 | $d_{15}$ | 2.67 | $n_8/\nu_8$ 1.80518/25.4 |
| $r_{16}$ | 208.000 | $d_{16}$ | 9.04 | $n_9/\nu_9$ 1.80400/46.6 |
| $r_{17}$ | −152.087 | | | |

$B_f = 137.80$
$F_2 = -179.96$
$F_3 = -146.66$
$F_{1\cdot 2\cdot 3} = -88.69$
$F_{1\cdot 2\cdot 3\cdot 4} = -261.16$
$F_{1\cdot 2\cdot 3\cdot 4\cdot 5\cdot 6} = 227.95$

EXAMPLE 2

| $F = 100$, Aperture ratio 1:2.8, $\omega = 37.8°$ | | | | |
|---|---|---|---|---|
| $r_1$ | 371.604 | $d_1$ | 6.42 | $n_1/\nu_1$ 1.58913/61.0 |
| $r_2$ | 4967.735 | $d_2$ | 0.22 | |
| $r_3$ | 74.335 | $d_3$ | 3.33 | $n_2/\nu_2$ 1.48749/70.1 |
| $r_4$ | 39.447 | $d_4$ | 17.78 | |
| $r_5$ | 147.007 | $d_5$ | 2.89 | $n_3/\nu_3$ 1.48749/70.1 |
| $r_6$ | 46.904 | $d_6$ | 20.98 | |
| $r_7$ | 131.647 | $d_7$ | 35.56 | $n_4/\nu_4$ 1.72000/43.7 |
| $r_8$ | −1950.662 | $d_8$ | 8.82 | |
| $r_9$ | 264.867 | $d_9$ | 24.44 | $n_5/\nu_5$ 1.72000/43.7 |
| $r_{10}$ | −89.404 | $d_{10}$ | 3.84 | |
| $r_{11}$ | −170.222 | $d_{11}$ | 13.04 | $n_6/\nu_6$ 1.80518/25.4 |
| $r_{12}$ | 117.564 | $d_{12}$ | 6.16 | |
| $r_{13}$ | −194.538 | $d_{13}$ | 5.76 | $n_7/\nu_7$ 1.83481/42.7 |
| $r_{14}$ | −79.969 | $d_{14}$ | 0.22 | |
| $r_{15}$ | −24683.000 | $d_{15}$ | 2.67 | $n_8/\nu_8$ 1.80518/25.4 |
| $r_{16}$ | 203.211 | $d_{16}$ | 10.00 | $n_9/\nu_9$ 1.80400/46.6 |
| $r_{17}$ | −194.169 | | | |

$B_f = 136.66$
$F_2 = -177.98$
$F_3 = -142.65$
$F_{1\cdot 2\cdot 3} = -86.96$
$F_{1\cdot 2\cdot 3\cdot 4} = -254.22$
$F_{1\cdot 2\cdot 3\cdot 4\cdot 5\cdot 6} = -230.54$

EXAMPLE 3

| $F = 100$, Aperture ratio 1:2.8, $\omega = 37.9°$ | | | | |
|---|---|---|---|---|
| $r_1$ | 382.749 | $d_1$ | 6.67 | $n_1/\nu_1$ 1.58913/61.0 |
| $r_2$ | 5036.477 | $d_2$ | 0.22 | |
| $r_3$ | 72.318 | $d_3$ | 3.33 | $n_2/\nu_2$ 1.48749/70.1 |
| $r_4$ | 38.991 | $d_4$ | 16.84 | |
| $r_5$ | 148.002 | $d_5$ | 2.89 | $n_3/\nu_3$ 1.48749/70.1 |
| $r_6$ | 47.873 | $d_6$ | 22.22 | |
| $r_7$ | 129.449 | $d_7$ | 34.58 | $n_4/\nu_4$ 1.72000/43.7 |
| $r_8$ | −26781.417 | $d_8$ | 7.93 | |
| $r_9$ | 267.587 | $d_9$ | 23.62 | $n_5/\nu_5$ 1.72000/43.7 |
| $r_{10}$ | −90.971 | $d_{10}$ | 5.20 | |
| $r_{11}$ | −173.691 | $d_{11}$ | 11.80 | $n_6/\nu_6$ 1.80518/25.4 |
| $r_{12}$ | 118.118 | $d_{12}$ | 6.58 | |
| $r_{13}$ | −160.873 | $d_{13}$ | 6.60 | $n_7/\nu_7$ 1.78590/44.2 |
| $r_{14}$ | −82.940 | $d_{14}$ | 0.22 | |
| $r_{15}$ | 29611.706 | $d_{15}$ | 2.67 | $n_8/\nu_8$ 1.80518/25.4 |
| $r_{16}$ | 169.378 | $d_{16}$ | 9.82 | $n_9/\nu_9$ 1.78590/44.2 |
| $r_{17}$ | −137.458 | | | |

$B_f = 138.11$
$F_2 = -179.44$
$F_3 = -146.54$
$F_{1\cdot 2\cdot 3} = -88.70$
$F_{1\cdot 2\cdot 3\cdot 4} = -248.00$
$F_{1\cdot 2\cdot 3\cdot 4\cdot 5\cdot 6} = -228.37$

What is claimed is:

1. A retrofocus wide-angle photographic lens system comprising in order from the object, a first positive-meniscus lens having a convex surface directed toward the object, second and third negative-meniscus lenses having convex surfaces directed toward the object, fourth and fifth positive lenses, a sixth biconcave lens, a seventh positive lens, an eighth negative lens, and a ninth positive lens, said eighth and ninth lenses forming a doublet to have a positive composite focal length, said lens system satisfying the following requirements:

$$\frac{F}{1.3} < |F_{1\cdot 2\cdot 3}| < \frac{F}{0.8} \quad (F_{1\cdot 2\cdot 3} < 0) \quad (1)$$

$$1.0 < \frac{F_2}{F_3} < 1.4 \quad (2)$$

$$\frac{F}{0.6} < |F_{1\cdot 2\cdot 3\cdot 4}| < \frac{F}{0.2} \quad (F_{1\cdot 2\cdot 3\cdot 4} < 0) \quad (3)$$

$$\frac{F}{0.5} < |F_{1\cdot 2\cdot 3\cdot 4\cdot 5\cdot 6}| < \frac{F}{0.3} \quad (F_{1\cdot 2\cdot 3\cdot 4\cdot 5\cdot 6} < 0) \quad (4)$$

$$0.5F < d_7 + d_8 + d_9 < 0.7F \quad (5)$$

$$n_8 > 1.75 \text{ and } n_9 > 1.75 \quad (6)$$

where F is the overall focal length of the lens system, $F_{1\cdot 2\ldots i}$ is the composite focal length up to the ith lens, $F_i$ is the focal length of the ith lens, $d_j$ is the lens-to-lens distance or thickness of the jth lens, and $n_i$ is the refractive index of the ith lens at the d-line.

2. The lens system according to claim 1 further satisfying the following chart:

| $F = 100$, Aperture ratio 1:2.8, $\omega = 37.9°$ | | | | |
|---|---|---|---|---|
| $r_1$ | 391.289 | $d_1$ | 7.04 | $n_1/\nu_1$ 1.58913/61.0 |
| $r_2$ | 5866.233 | $d_2$ | 0.22 | |
| $r_3$ | 71.556 | $d_3$ | 3.33 | $n_2/\nu_2$ 1.48749/70.1 |

-continued

| F = 100, Aperture ratio 1:2.8, ω = 37.9° | | | | |
|---|---|---|---|---|
| $r_4$ | 38.809 | $d_4$ | 17.11 | |
| $r_5$ | 144.444 | $d_5$ | 2.89 | $n_3/\nu_3$ 1.48749/70.1 |
| $r_6$ | 47.511 | $d_6$ | 23.13 | |
| $r_7$ | 126.869 | $d_7$ | 34.47 | $n_4/\nu_4$ 1.72000/43.7 |
| $r_8$ | −30309.433 | $d_8$ | 7.78 | |
| $r_9$ | 270.000 | $d_9$ | 23.67 | $n_5/\nu_5$ 1.72000/43.7 |
| $r_{10}$ | −91.867 | $d_{10}$ | 4.33 | |
| $r_{11}$ | −174.198 | $d_{11}$ | 11.89 | $n_6/\nu_6$ 1.80518/25.4 |
| $r_{12}$ | 118.222 | $d_{12}$ | 6.18 | |
| $r_{13}$ | −169.133 | $d_{13}$ | 5.56 | $n_7/\nu_7$ 1.83481/42.7 |
| $r_{14}$ | −82.000 | $d_{14}$ | 0.22 | |
| $r_{15}$ | −2966.666 | $d_{15}$ | 2.67 | $n_8/\nu_8$ 1.80518/25.4 |
| $r_{16}$ | 208.000 | $d_{16}$ | 9.04 | $n_9/\nu_9$ 1.80400/46.6 |
| $r_{17}$ | −152.087 | | | |
| $B_f = 137.80$ | | | | |
| $F_2 = -179.96$ | | | | |
| $F_3 = -146.66$ | | | | |
| $F_{1\cdot 2\cdot 3} = -88.69$ | | | | |
| $F_{1\cdot 2\cdot 3\cdot 4} = -261.16$ | | | | |
| $F_{1\cdot 2\cdot 3\cdot 4\cdot 5\cdot 6} = 227.95$ | | | | | where $r_i$ is the radius of curvature of the i-th lens surface in order from the object, $\nu_i$ is the Abbe number of the i-th lens and $B_f$ is the back focus.

3. The lens system according to claim 1 further satisfying the following chart:

| F = 100, Aperture ratio 1:2.8, ω = 37.8° | | | | |
|---|---|---|---|---|
| $r_1$ | 371.604 | $d_1$ | 6.42 | $n_1/\nu_1$ 1.58913/61.0 |
| $r_2$ | 4967.735 | $d_2$ | 0.22 | |
| $r_3$ | 74.335 | $d_3$ | 3.33 | $n_2/\nu_2$ 1.48749/70.1 |
| $r_4$ | 39.447 | $d_4$ | 17.78 | |
| $r_5$ | 147.007 | $d_5$ | 2.89 | $n_3/\nu_3$ 1.48749/70.1 |
| $r_6$ | 46.904 | $d_6$ | 20.98 | |
| $r_7$ | 131.647 | $d_7$ | 35.56 | $n_4/\nu_4$ 1.72000/43.7 |
| $r_8$ | −1950.662 | $d_8$ | 8.82 | |
| $r_9$ | 264.867 | $d_9$ | 24.44 | $n_5/\nu_5$ 1.72000/43.7 |
| $r_{10}$ | −89.404 | $d_{10}$ | 3.84 | |
| $r_{11}$ | −170.222 | $d_{11}$ | 13.04 | $n_6/\nu_6$ 1.80518/25.4 |
| $r_{12}$ | 117.564 | $d_{12}$ | 6.16 | |
| $r_{13}$ | −194.538 | $d_{13}$ | 5.76 | $n_7/\nu_7$ 1.83481/42.7 |
| $r_{14}$ | −79.969 | $d_{14}$ | 0.22 | |
| $r_{15}$ | −24683.000 | $d_{15}$ | 2.67 | $n_8/\nu_8$ 1.80518/25.4 |
| $r_{16}$ | 203.211 | $d_{16}$ | 10.00 | $n_9/\nu_9$ 1.80400/46.6 |
| $r_{17}$ | −194.169 | | | |
| $B_f = 136.66$ | | | | |
| $F_2 = -177.98$ | | | | |
| $F_3 = -142.65$ | | | | |
| $F_{1\cdot 2\cdot 3} = -86.96$ | | | | |
| $F_{1\cdot 2\cdot 3\cdot 4} = -254.22$ | | | | |
| $F_{1\cdot 2\cdot 3\cdot 4\cdot 5\cdot 6} = -230.54$ | | | | | where $r_i$ is the radius of curvature of the i-th lens surface in order from the object, $\nu_i$ is the Abbe number of the i-th lens and $B_f$ is the back focus.

4. The lens system according to claim 1 further satisfying the following chart:

| F = 100, Aperture ratio 1:2.8, ω = 37.9° | | | | |
|---|---|---|---|---|
| $r_1$ | 382.749 | $d_1$ | 6.67 | $n_1/\nu_1$ 1.58913/61.0 |
| $r_2$ | 5036.477 | $d_2$ | 0.22 | |
| $r_3$ | 72.318 | $d_3$ | 3.33 | $n_2/\nu_2$ 1.48749/70.1 |
| $r_4$ | 38.991 | $d_4$ | 16.84 | |
| $r_5$ | 148.002 | $d_5$ | 2.89 | $n_3/\nu_3$ 1.48749/70.1 |
| $r_6$ | 47.873 | $d_6$ | 22.22 | |
| $r_7$ | 129.449 | $d_7$ | 34.58 | $n_4/\nu_4$ 1.72000/43.7 |
| $r_8$ | −26781.417 | $d_8$ | 7.93 | |
| $r_9$ | 267.587 | $d_9$ | 23.62 | $n_5/\nu_5$ 1.72000/43.7 |
| $r_{10}$ | −90.971 | $d_{10}$ | 5.20 | |
| $r_{11}$ | −173.691 | $d_{11}$ | 11.80 | $n_6/\nu_6$ 1.80518/25.4 |
| $r_{12}$ | 118.118 | $d_{12}$ | 6.58 | |
| $r_{13}$ | −160.873 | $d_{13}$ | 6.60 | $n_7/\nu_7$ 1.78590/44.2 |
| $r_{14}$ | −82.940 | $d_{14}$ | 0.22 | |
| $r_{15}$ | 29611.706 | $d_{15}$ | 2.67 | $n_8/\nu_8$ 1.80518/25.4 |
| $r_{16}$ | −169.378 | $d_{16}$ | 9.82 | $n_9/\nu_9$ 1.78590/44.2 |
| $r_{17}$ | −137.458 | | | |
| $B_f = 138.11$ | | | | |
| $F_2 = -179.44$ | | | | |
| $F_3 = -146.54$ | | | | |
| $F_{1\cdot 2\cdot 3} = -88.70$ | | | | |
| $F_{1\cdot 2\cdot 3\cdot 4} = -248.00$ | | | | |
| $F_{1\cdot 2\cdot 3\cdot 4\cdot 5\cdot 6} = -228.37$ | | | | | where $r_i$ is the radius of curvature of the i-th lens surface in order from the object, $\nu_i$ is the Abbe number of the i-th lens and $B_f$ is the back focus.

* * * * *